United States Patent
Lakaniemi et al.

(10) Patent No.: US 7,319,703 B2
(45) Date of Patent: Jan. 15, 2008

(54) METHOD AND APPARATUS FOR REDUCING SYNCHRONIZATION DELAY IN PACKET-BASED VOICE TERMINALS BY RESYNCHRONIZING DURING TALK SPURTS

(75) Inventors: Ari Lakaniemi, Helsinki (FI); Jari Selin, Helsinki (FI); Pasi Ojala, Lempäälä (FI)

(73) Assignee: Nokia Corporation, Espoo (FI)

( * ) Notice: Subject to any disclaimer, the term of this patent is extended or adjusted under 35 U.S.C. 154(b) by 1015 days.

(21) Appl. No.: 10/189,068

(22) Filed: Jul. 2, 2002

(65) Prior Publication Data

US 2003/0043856 A1 Mar. 6, 2003

Related U.S. Application Data

(63) Continuation-in-part of application No. 09/946,066, filed on Sep. 4, 2001.

(51) Int. Cl.
*H04J 3/07* (2006.01)
(52) U.S. Cl. ......................... 370/505; 700/94
(58) Field of Classification Search ............... 370/252, 370/412, 503, 505; 700/94; 704/220
See application file for complete search history.

(56) References Cited

U.S. PATENT DOCUMENTS

| 5,699,481 A | 12/1997 | Shlomot et al. ........... 395/2.37 |
| 5,825,771 A | 10/1998 | Cohen et al. ............... 370/394 |
| 6,157,653 A * | 12/2000 | Kline et al. ................. 370/412 |
| 6,181,712 B1 | 1/2001 | Rosengren ................. 370/474 |
| 6,240,386 B1 * | 5/2001 | Thyssen et al. ............. 704/220 |
| 6,259,677 B1 * | 7/2001 | Jain ........................... 370/252 |
| 6,377,923 B1 * | 4/2002 | Hershkovits et al. ....... 704/253 |
| 6,452,950 B1 | 9/2002 | Ohlsson et al. ............. 370/516 |
| 6,504,838 B1 | 1/2003 | Kwan ......................... 370/352 |
| 6,763,274 B1 * | 7/2004 | Gilbert ....................... 700/94 |

FOREIGN PATENT DOCUMENTS

| EP | 0 921 666 A2 | 6/1999 |
| WO | WO-01/11832 A1 | 8/2000 |
| WO | WO 01/48736 A1 | 7/2001 |

\* cited by examiner

*Primary Examiner*—Chi Pham
*Assistant Examiner*—Albert T. Chou
(74) *Attorney, Agent, or Firm*—Harrington & Smith, PC (57) ABSTRACT

Circuitry, embodied in a media subsystem (10A), reproduces a speech or other type of audio signal, and is operable when playing back audio data for reducing synchronization delay. A method operates by, when a frame containing audio data is sent to a decoder (20), measuring the synchronization delay; determining by how much the synchronization delay should be adjusted; and adjusting the synchronization delay in a content-aware manner by adding or removing one or more audio samples in a selected current frame or in a selected subsequent frame so as not to significantly degrade the quality of the played back audio data. When the synchronization delay is adjusted by more than one audio sample, the adjustment can be made by all of the determined audio samples in one adjustment, or the adjustment is made by less than all of the determined audio samples by a plurality of adjustments. The step of adjusting selects, if possible, an unvoiced frame and discriminates against a transient frame. The step of determining includes measuring an average amount of time that a frame resides in a jitter buffer (18), and adjusting the synchronization delay so that the average duration approaches a desired jitter buffer residency duration.

36 Claims, 4 Drawing Sheets

METHOD AND APPARATUS FOR REDUCING SYNCHRONIZATION DELAY IN PACKET-BASED VOICE TERMINALS BY RESYNCHRONIZING DURING TALK SPURTS

CROSS-REFERENCE TO A RELATED APPLICATION

This patent application is a continuation-in-part of copending and commonly assigned U.S. patent application Ser. No. 09/946,066, filed Sep. 4, 2001, entitled "Method and Apparatus for Reducing Synchronization Delay in Packet-Based Voice Terminals", by Jari Selin, the content of which is incorporated by reference herein in its entirety.

TECHNICAL FIELD

These teachings relate generally to methods and systems that process packetized audio data and, more particularly, these teachings pertain to systems and methods that receive and playback Internet Protocol (IP) speech or voice data packets, such as wireless communications terminals and personal computer (PC) based terminals.

BACKGROUND

Figure 2:
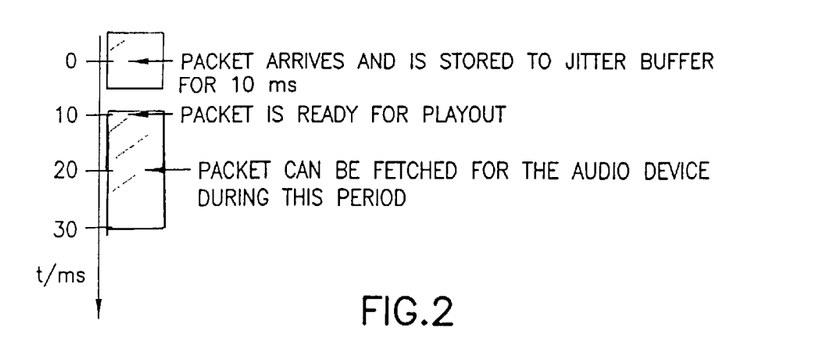
FIG. 2 is a diagram that is useful in understanding the synchronization delay between the media subsystem of FIG. 1 and arriving IP audio data packets.

It is well known in packet-based terminals and devices, such as wireless communications terminals (e.g., mobile and cellular telephones or personal communicators), PC-based terminals as well as IP telephony gateways, that an audio device requests data to be converted into audio at regular, fixed intervals. These intervals are not, however, synchronized to the reception of the data packets that contain the audio data. A given packet can contain one or more frames of data, where the length or duration of an audio signal contained within the frame is generally in the range of 20 ms to 30 ms (referred to herein generally as the "frame length", although a temporal measure is intended, not a spatial measure.) After reception, the audio data frame is typically stored into a jitter buffer to await its calculated playout time. The playout time is the time during which the frame of audio data is to be converted to an audio signal, such as by a digital-to-analog converter (DAC), then amplified and reproduced for a listener through a speaker or some other type of audio transducer. In the case of gateways and transcoders, the audio is typically sent to a sample-based circuit switched network. In that the audio device requests the frame data at random intervals, relative to the receipt of the audio packets, the data can be stored for a variable amount of time in the jitter buffer. The storage time in the jitter buffer can be shown to be one half of the duration of the frame in addition to the desired jitter buffer duration. In FIG. 2 this is demonstrated: the packet resides in the jitter buffer first for the desired 10 ms, after which it is playable, the frame, however will be fetched at some time during the next 20 ms, resulting in the undesired average of 10 ms of additional storage time in the jitter buffer.

A problem arises because of the fact that in modern voice terminals and similar devices, such as IP telephony gateways, the audio device is synchronized to some local frequency source. The frequency source may be, for example, an oscillator or a telephone network clock signal. However, in packet-based terminals, the packets containing the voice data arrive at a rate that is independent of and asynchronous to the frequency source that drives the audio device. The difference between the rate of IP packet arrival and the rate at which the audio device requests frames of voice data can create an undesirable and variable "synchronization delay".

Furthermore, due to slight differences in clock rates this difference between the rate of IP packet arrival and the rate at which the audio device requests frames of voice data can vary over time, thus constituting a continuous re-synchronization problem.

The prior commonly assigned application referred to above, of which this application is a continuation-in-part, describes a system and method wherein synchronization is performed at the start of a talk spurt, and not continuously. However, with long talk spurts this may be a less than optimum approach if the synchronization cannot be performed in timely manner. Furthermore, this is a problem that can be difficult to handle in a controlled way if the speech codec is used without silence compression.

In EP 0 921 666 A2 Ward et al. are said to reduce degradation in packetized voice communications that are received by a non-synchronized entity from a packet network by adjusting a depth of storage of a jitter buffer in the receiver. Units of voice sample data are stored in the jitter buffer as they are received. From time to time the rate of extraction of the stored units from the jitter buffer is accelerated by extracting two units, but delivering only one, or is retarded by not extracting a unit, while delivering a substitute unit in its place. This technique is said to control the depth of storage in response to packet reception events such that the delay is minimized, while providing a sufficient amount of delay to smooth the variances between packet reception events.

In WO 01/11832 A1 Nakabayashi describes the use of a receive buffer that stores packets received from a network interface, and a reproduction controller that refers to the state of the receive buffer to carry out a sound reproduction operation. A decoder receives the stored data, and the decoded data is provided to a DAC that is clocked by a reproduce clock. The process is said to prevent to the underflow and overflow of the receive buffer due to clock differences between the transmitter and the receiver, and to prevent packet jitter that results in sound dropouts.

In U.S. Pat. No. 6,181,712 B1 Rosengren describes transmitting packets from an input stream to an output stream. When multiplexing transport streams, packet jitter may be introduced to the extent that decoder buffers can underflow or overflow. To avoid this, a time window is associated with a data packet and position information is provided in the packet concerning the position of the packet within the window.

SUMMARY OF THE PREFERRED EMBODIMENTS

The foregoing and other problems are overcome, and other advantages are realized, in accordance with the presently preferred embodiments of these teachings.

In accordance with the teachings of this invention, in addition to performing synchronization at the start of a talk spurt, synchronization can be accomplished during a talk spurt, thereby enabling an immediate reaction to be made to an observed mis-synchronization event. Additionally, the method can be applied in those cases where no speech silence compression is utilized. The re-synchronization process according to this invention does not require complex data processing to implement, as information that is already available via the speech decoder can be utilized for the re-synchronization process.

Circuitry, embodied in a media subsystem, reproduces a speech or other type of audio signal, and is operable when playing back audio data for reducing synchronization delay. A method operates, when a frame containing audio data is sent to a decoder, by measuring the synchronization delay; determining by how much the synchronization delay should be adjusted; and adjusting the synchronization delay in a content-aware manner by adding or removing one or more audio samples in a selected current frame or in a selected subsequent frame so as not to significantly degrade the quality of the played back audio data. When the synchronization delay is adjusted by more than one audio sample, the adjustment can be made by all of the determined audio samples in one adjustment, or the adjustment is made by less than all of the determined audio samples by a plurality of adjustments. The step of adjusting selects, if possible, an unvoiced frame and discriminates against a transient frame. The step of determining includes measuring an average amount of time that a frame resides in a jitter buffer; and adjusting the synchronization delay so that the average duration approaches a desired jitter buffer residency duration.

In one exemplary, but not limiting, embodiment the circuitry is contained within a wireless communications device, such as a cellular telephone or a personal communicator. In other embodiments the circuitry and method can be a portion of, for example, PC-based terminals, IP telephony gateways and IP-to-circuit switched media transcoders

BRIEF DESCRIPTION OF THE DRAWINGS

The foregoing and other aspects of these teachings are made more evident in the following Detailed Description of the Preferred Embodiments, when read in conjunction with attached Drawing Figures, wherein.

DETAILED DESCRIPTION OF THE PREFERRED EMBODIMENTS

It is noted at the outset that these teachings are applicable to any system or apparatus that processes and plays back packetized (or framed) audio data, such as mobile and cellular telephones, personal communicators, PC-based terminals, IP telephony gateways and IP-to-circuit switched media transcoders. These various types of devices and systems may all be referred to herein simply as a terminal. In other words, these teachings are applicable to any device that links packet-based voice to circuit switched or otherwise continuous voice. Hence the method is also applicable to these various devices, including gateways and transcoders linking IP and PCM links.

Figure 1:
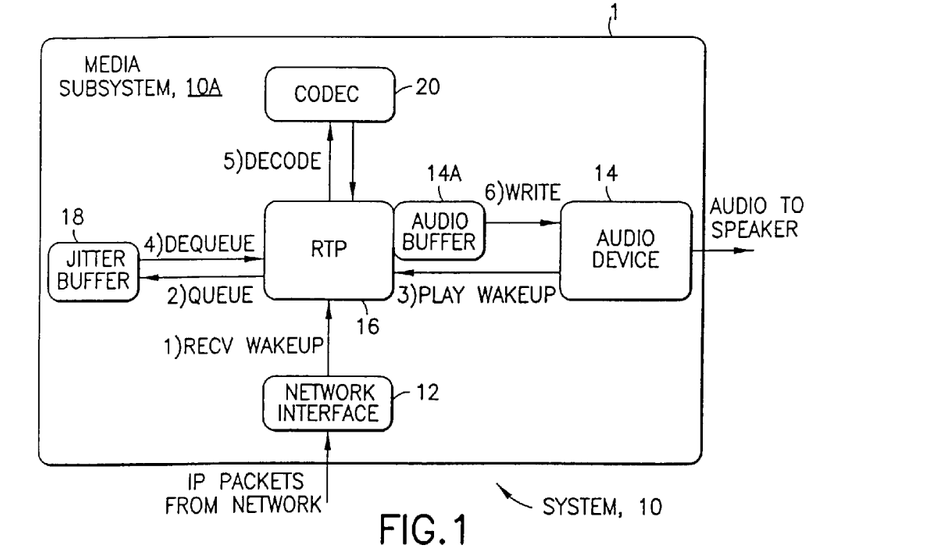
FIG. 1 is a simplified block diagram of a media subsystem of an audio reproduction system, and also depicts media flow during audio data packet reception and playback.

FIG. 1 is a simplified block diagram of a medium subsystem 10A of an audio reproduction system 10, and also depicts the media flow during audio reception. While described primarily in the context of a wireless communication device, such as a cellular telephone or a personal communicator, it should be appreciated that the system 10 can also be, by example and not by way of limitation, a PC-based terminal or an IP telephony gateway. IP packets arrive at a network interface 12 from a physical layer, in this case some type of packet switched medium or network, such as a dial-up telephone line, an Ethernet connection, or a wireless air interface (e.g., the packets are modulated onto an RF carrier or onto an optical carrier). The network interface 12 may also be referred to as the IP stack of the system 10. The time of arrival of individual packets at the network interface 12 is not synchronized with the operation of an audio device 14, which may be, by way of example only, a DAC of a mobile telephone, or the PCM connection of an IP telephony gateway. The audio device 14 may implement one of a number of different interfaces such as, but not limited to Linux audio API (application programming interface), Windows audio API, and PCM line card.

When a packet arrives at the network interface 12 the media subsystem 10A receives a callback (1), and the packet is received by a real-time transport protocol (RTP) module 16. Reference with regard to RTP may be had to H. Schulzrinne, S. Casner, R. Frederick and V. Jacobson, *RTP: a transport protocol for real-time applications,* IETF Network Working Group, RFC 1889, Standards Track, January 1996, 75 p. and to H. Schulzrinne, *RTP Profile for Audio and Video Conferences with Minimal Control,* IETF Network Working Group RFC 1890, Standards Track, January 1996, 18 p. Playout times for the frames contained within the packet are calculated. In a next step (2) the RTP module 16 inserts or queues the frames into a jitter buffer 18. When the audio device 14 begins to run out of data to play, it wakes up or interrupts the media subsystem 10A (3) and makes a request to the RTP module 16 for more data to play. In response, the RTP module 16 checks to determine if there is a sufficient amount of speech data in its internal audio buffer to fill the audio device buffer. If there is enough data, it is written immediately to the audio device. (jump to step 6) If the data in the buffer is comfort noise, or if there is an insufficient amount of data, the next playable frame is dequeued or fetched from the jitter buffer 18 according to the calculated playout time of the frame (4). The dequeued frame is then sent to an audio codec 20 such as, but not limited to, a PCM codec, a G.711 codec (*Pulse code modulation (PCM) of voice frequencies,* ITU-T Recommendation G.711, 1972, 18 p.), a G.723.1 codec (*Dual rate speech coder for multimedia communications transmitting at 5.3 and 6.3 kbit/s,* ITU-T Recommendation G.723.1, March 1996, 27 p.), or an AMR codec (*Mandatory speech codec speech processing functions. AMR speech codec; transcoding functions,* 3GPP Technical specification Group Services and System Aspects, 3G TS 26.090 V3.0.1, September 1999, 61 p.), which decodes the audio data and returns a decoded audio data frame to the RTP module 16 at step (5). The various codecs 20 that are useable by the apparatus and method of these teachings may or may not have a voice activity detection (VAD) function. If there was no data in the jitter buffer to decode, comfort noise or error concealment data is generated, depending on codec type and internal state. At step (6), the RTP module 16 writes the audio data to the audio device 14, and the media subsystem 10A then returns to the sleep state to wait for the next wakeup.

Figure 3:
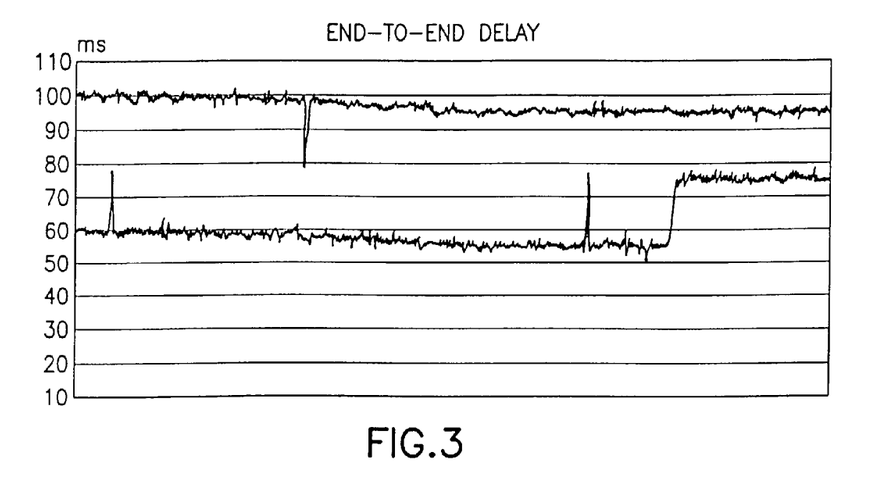
FIG. 3 is a diagram that shows a typical end-to-end delay experienced with a terminal-to-terminal call using a 20 ms frame length.

In general, the audio device 14 requests data representing playable sound at regular intervals, such as every 20 ms (i.e., the codec 20 frame rate). However, the reception of the IP packets from the packet network is not synchronized to the play wakeups generated by the audio device 14. More particularly, the audio device 14 typically will process audio in blocks of data that are the same length as the frame length of the codec 20, such as 20 ms. This results in an average synchronization delay of about one half of the frame length. For example, if the average frame length is 20 ms, then the average synchronization delay is about 10 ms. FIG. 2 depicts an exemplary synchronization delay for a 20 ms frame length, and FIG. 3 shows the end-to-end delay between two terminals with a frame length of 20 ms. In FIG. 3 the measurement points occur about once per second, the lower trace represents a 0 ms length jitter buffer while the upper trace represents a 30 ms jitter buffer. Note in FIG. 3 that the delay makes sudden excursions of about 20 ms, and then suddenly shifts by about 20 ms. The changes of delay are due to the lack or synchronization between the arriving IP packets and the operation of the audio device 14. The gradual shift in the synchronization delay is due to the use of the different clock frequencies in the two terminals (sender and receiver), and the resulting inability to maintain synchronization between the terminals.

The teachings described in the above referenced U.S. Patent application, of which this application is a continuation-in-part, arise from an appreciation that many modern audio codecs have a voice activity detection (VAD) and comfort noise generation function, which means that when no speech (i.e., silence) is detected, no speech data is sent. Instead, silence information descriptor (SID) data is calculated and periodically transmitted, from which the receiving end synthesizes artificial background noise for the listener, commonly referred to as comfort noise. It has been found that the speech data tends to arrive during short intervals or periods referred to as talk spurts, which on average last for about one second, and which are preceded and followed by silent periods during which comfort noise is generated. By not transmitting during the unvoiced or silent periods, communications link bandwidth is conserved, and the power consumption of battery powered portable receiving terminals is also reduced. General reference with regard to the use of comfort noise can be made to commonly assigned U.S. Pat. Nos. 5,835,889 by Kapanen and 5,960,389 by Jarvinen et al. The use of the silence descriptor information is exploited in the manner described below.

In accordance with the teachings of the above referenced U.S. Patent application, the synchronization of the media subsystem 10A to the arrival of the incoming data packets is reset at the start of a new interval of speech, i.e., to the start of a new talk spurt. This implies, in a normal case, that the resynchronization would have an accuracy of about one frame length (e.g., 20 ms). The synchronization delay experienced by the media subsystem 10A is reduced to less than the codec frame length (e.g., less than 20 ms), without adversely affecting voice quality, by the following method. First, the audio device 14 frame length is made to be some fraction of the frame length of the codec 20. For example, the audio device 14 frame length is reduced to one quarter of the frame length of the codec 20 (i.e., to 5 ms). This causes the audio device 14 to request audio data every 5 ms. A single 20 ms frame of audio data is decoded from the codec 20 to the buffer 14A, which is then fed to the audio device 14 in 5 ms increments. In addition, the type of audio data stored in the buffer 14A is recorded (i.e., whether it is voice data or comfort noise data).

During a period of comfort noise generation, the jitter buffer 18 is checked after every audio device 14 callback (or every 5 ms in this example) to determine if new playable data (e.g., voice data) has arrived from the packet data network. If no new playable data has arrived, then the audio device 14 continues to operate on the comfort noise data in the buffer 14A. However, if new playable data is detected in the jitter buffer 18, the comfort noise data in the buffer 14A is removed or overwritten with the just-arrived playable data, after it is decoded by the codec 20. That is, the playing of the comfort noise data is prematurely terminated, and the playing of the playable (e.g., voice) data is started sooner than it would normally have been. In this manner the synchronization delay is reduced to be one half of the audio device frame length, in this case to 2.5 ms, resulting in 7.5 ms of end-to-end delay being eliminated. This synchronization of the media subsystem timing 10A to the timing of the arriving voice data packets occurs at the beginning of each talk spurt.

As was noted above, some clock drift may occur during an excessively long talk spurt, and this accommodated by re-synchronizing the media subsystem 10A during the talk spurt, as will be described in further detail below.

It is noted that the above-referenced error concealment data differs from comfort noise data, and if present is preferably not replaced by voice data.

The use of the foregoing procedure does not deteriorate the quality of the speech reproduced by the audio device 14, as the synchronization operation occurs during comfort noise generation, not during times when speech is being reproduced to the listener. Furthermore, in that the generation of the comfort noise generally produces a lower powered audio signal than does the generation of a voiced audio signal, the removal of a fraction of a comfort noise frame is typically not audible to the listener.

It can be appreciated that the foregoing synchronization optimization becomes even more beneficial if the frame length of the codec 20 is larger (e.g., 30 ms or 60 ms).

Figure 4:
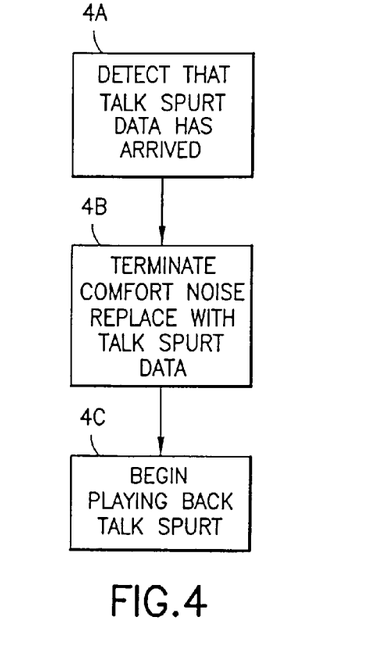
FIG. 4 is a logic flow diagram depicting the operation of the media subsystem when performing initial talk spurt synchronization.

Referring to FIG. 4, a method for operating the media subsystem 10A for playing back audio data includes, at Step 4-A, during a time that comfort noise is being generated by the audio device 14, detecting an arrival of a data packet that contains audio data representing a beginning of a talk spurt. At Step 4-B the method resynchronizes the media subsystem 10A to the beginning of the talk spurt by terminating the generation of comfort noise that precedes the talk spurt, and at Step 4-C the audio device 14 plays back the talk spurt.

The arriving data packet is assumed to contain at least one frame of audio data having a playback duration of X milliseconds (e.g., in the range of about 20 ms to about 60 ms), and the audio device 14 is arranged to request decoded audio data to be played back at a rate given by X/Y milliseconds, where Y is greater than one. For example, Y may be set so that X/Y<10 ms. Further by example, Y may be set so that X/Y=5 ms.

Figure 5:
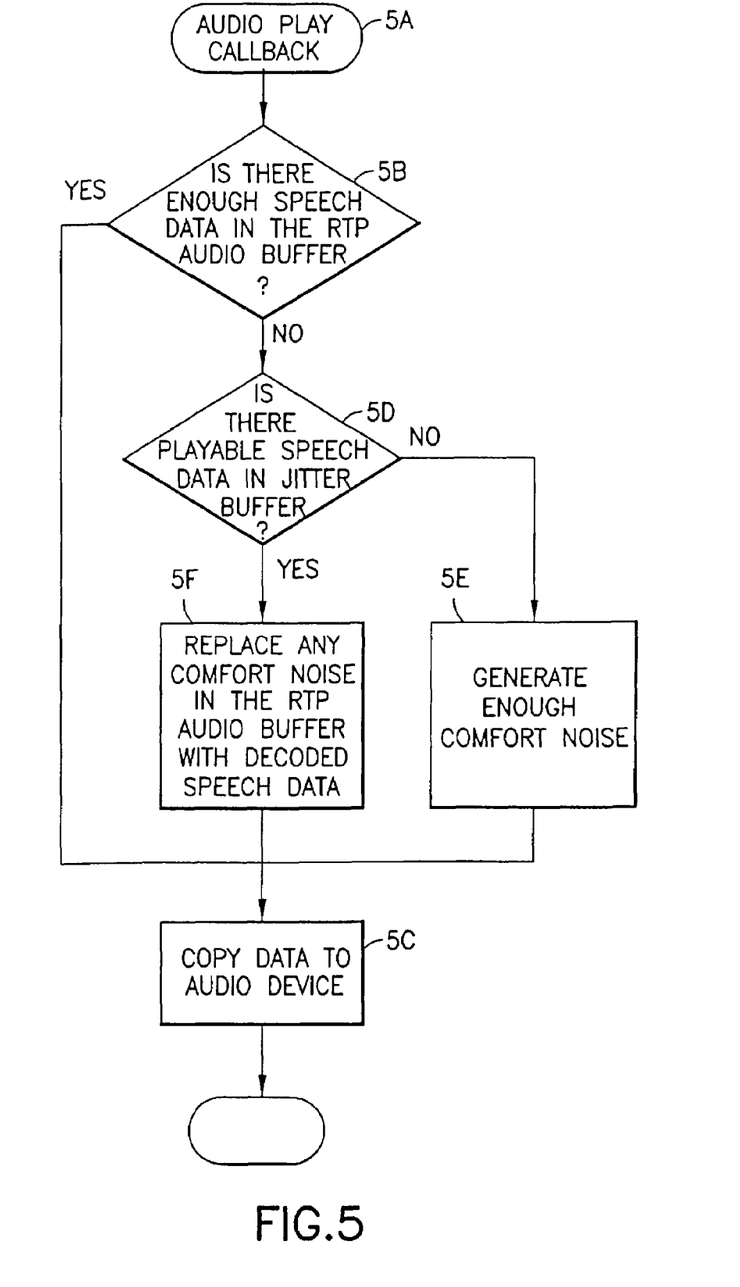
FIG. 5 is a more detailed logic flow diagram of the operation of the media subsystem when performing the initial talk spurt synchronization.

FIG. 5 is a more detailed logic flow diagram of the procedure outlined in FIG. 4. The method starts at Step 5-A at an audio play callback event. At Step 5-B a determination is made as to whether there is sufficient speech data in the RTP audio buffer 14A. If the determination is affirmative, control passes to Step 5-C to copy the data from the buffer 14A to the audio device 14. If the determination at Step 5-B is not affirmative, control instead passes to Step 5-D where a determination is made as to whether there is playable speech data in the jitter buffer 18. If No, comfort noise is generated at Step 5-E, and control then passes to Step 5-C to copy the comfort noise data to the audio device 14. If, however, playable speech data is found in the jitter buffer 18 at Step 5-D, then at Step 5-F any comfort noise data in the RTP speech buffer 14A is replaced with the (decoded) speech data, and control then passes to Step 5-C to copy the decoded speech data to the audio device 14.

Having thus described the method and apparatus in accordance with the teachings described in the above referenced U.S. Patent application, of which this application is a continuation-in-part, a description is now provided of embodiments of this invention.

The slow movement in the end-to-end delay shown in FIG. 3 indicates also that the time difference between the playout time and the time when the audio device 14 fetches the packet is slowly reduced. Eventually the audio device 14 attempts to fetch a packet before the packet has arrived arrives at the network interface 12. In this case the jitter buffer 18 underflows, resulting in a packet loss at the audio device 14 and a 20 ms addition to the end-to-end delay.

If the drift were in another direction, i.e., if the delay slowly increases, the time difference between playout time and packet fetching would increase slowly. In this case the jitter buffer 18 will eventually overflow, causing a packet loss at the jitter buffer 18 and a 20 ms jump in the end-to-end delay.

In order to gain a better appreciation of the operation of this invention, a brief discussion will first be made of typical speech signal characteristics. The speech signal includes sections of differing type. During a conversation typically only one of the parties is speaking at a time, and this introduces an overall structure of alternating talking and listening (active/non-active) periods for the speech signal. This also implies that on average the signal contains actual speech information at most 50% of the time. Additionally, there is also a finer structure to the speech signal. For example, typically the speech signal will contain non-active periods between sentences, between words, and in some cases even between phonemes within a word. As can be appreciated, the nature of this finer structure is heavily dependent on the nature of the language being spoken and on the speech characteristics of the speaker.

Furthermore, active speech can be further classified into different sub-categories. A typical classification would be a division into voiced (periodic) and unvoiced (noise-like) classification categories or classes. GSM speech codecs (e.g., an AMR codec) process speech in 20 ms frames, and in many cases the entire frame can be classified either as a voiced frame or an unvoiced frame. However, usually the transition from unvoiced to voiced (and vice versa) occurs relatively quickly and, in many cases, one 20 ms frame has a sufficient duration to include both a unvoiced and an voiced speech component. Thus, the transition between unvoiced and voiced introduces a third classification category of transient speech (or a transient frame). Furthermore, one can consider as a fourth classification category a so-called onset frame, which means the frame contains the start of an active speech period following a non-active speech period.

In many communication systems the data stream can be subject to losses in transport. For example, during transmission over a radio link the frame may become corrupted by bit errors, or in a packet switched network a packet carrying the frame can be lost due to network congestion. From the point of view of the receiver this implies that some number of the received frames are corrupted or even totally lost. Because, in principle, even very short interruptions result in the creation of annoying artifacts in the reconstructed speech signal, those speech codecs designed to operate in error prone conditions are equipped with error concealment algorithms to minimize the effect of corrupted and/or lost frames. Error concealment typically exploits the stationary nature of the speech signal by extrapolating the parameters of the corrupted/erased frame based on preceding valid frames. This type of error concealment technique works well when only a short period of speech is required to be replaced, but when several consecutive frames or some relatively large number of frames within a short time period are missing, the estimation of lost frames becomes more difficult, and the result of the error concealment process is less than optimum.

There is an additional effect caused by a frame erasure. The effective speech compression (and decompression) is partially based on strong dependencies between successive speech frames. For example, in AMR the speech codec operates as a type of state machine, and many of the transmitted speech parameters are coded relative to the current state of the speech encoder. The state of the encoder is updated with each transmitted frame, and the decoder state is similarly updated with each received frame. When a frame erasure occurs, in addition to the actual lost frame, the speech quality degradation also propagates to the next few frames because the synchronization between encoder and decoder states is temporarily lost and, therefore, the decoding of some of the parameters fails. Although error concealment can mask this effect partially, it typically requires at least a few frames after a loss until the state of the decoder becomes re-synchronized with the encoder and the speech quality returns to an acceptable or normal level.

With regard now to speech frame types and their contribution to subjective quality, as was described above the speech signal can be classified to into different types of frames. It has been noticed that different frame types have in general different contribution to the subjective speech quality, i.e., some of the frames are more important than others. As may be expected, those speech frames carrying data for the non-active speech signal are not considered to make a significant contribution to the speech quality. Thus, usually losing a frame or even several (consecutive) frames during a non-active period does not generally degrade the speech quality.

Also, some of the frames containing active speech are more important to the subjective speech quality than others. Unvoiced frames are typically noise-like and carry relatively little spectral information. If lost, these frames can be compensated for without a noticeable effect, as long as the energy level of the signal remains relatively constant. Voiced frames, however, typically contain a clear periodic structure with distinct spectral characteristics. Since the voiced signal usually remains constant (or introduces a constant and small change in structure), if lost these voiced frames can be relatively effectively compensated for with extrapolation based error concealment by repeating (or slightly adjusting) the structure from the previous frame. Thus, so long as not too many frames are missing (in many cases more than two missing frames tends to cause audible distortion in the output signal), the error concealment can conceal the lost unvoiced and voiced frames quite effectively without an annoying quality degradation in the reproduced speech.

However the remaining frame types, i.e., the transient and onset frames, are clearly more difficult cases for the error concealment algorithm. This can be expected, as the error concealment process operates by exploiting the stationary nature of speech by using extrapolation, but these frame types introduce sudden changes in signal characteristics that are impossible to predict in an accurate manner. Therefore, losing a transient frame or an onset frame will almost always lead to an audible short-term speech quality degradation.

With regard to synchronization, in conventional systems the playout time offset is established when a new talk spurt begins. If the playout delay for the current talk spurt is different from the playout delay used for the previous talk spurt, the receiver must either omit part of the signal, or it must generate a period of additional signal to compensate for the discontinuity, depending on whether the new playout delay was shorter or longer than the previous one. This type of manipulation of the speech signal is likely to cause a clearly audible degradation in the perceived speech quality at the point of the discontinuity if the process is not performed with great care. The conventional approach aims to minimize the quality degradation by always performing the re-synchronization when the signal consists of comfort noise only.

The foregoing and other disadvantages are overcome by minimizing the synchronization delay by performing re-synchronization, in a content aware manner, during talk spurts. As was described above, the speech signal contains distinct periods each making a different contribution to the overall subjective speech quality. By utilizing this knowledge the system 10 in accordance with this invention performs the re-synchronization during a period of speech that is selected such that the signal manipulation required by the re-synchronization process does not adversely affect the speech quality. It should be noted that from the end-user's point of view manipulating the speech signal introduces an effect not unlike a transmission error, therefore the discussion made above regarding transmission errors applies as well here.

Thus, when using the speech frame classification given above it should be apparent that one should not perform re-synchronization during a transient speech frame or during an onset speech frame. Furthermore, re-synchronization during voiced speech frames is preferably avoided, but it can be performed if the need for re-synchronization is urgent. However, when manipulating the voiced speech signal a preferred approach re-synchronizes in small steps (e.g., only few samples or even one sample at a time), or re-synchronizes in steps having a duration that corresponds to the current pitch period.

With regard to the pitch period, it can be noted that in most CELP-type speech codecs the pitch period is one of the parameters extracted by the encoder and transmitted to the decoder (this applies to, e.g., GSM codecs EFR, AMR, AMR-WB, ITU-T codecs G.723.1 & G.729, etc). Furthermore, and by example, in the AMR codec the 20 ms frame is further divided into subframes of 5 ms, and a separate pitch period value is computed and transmitted for each of the subframes.

An approximate frame classification between voiced and unvoiced can be made by following the history of pitch period values. More specifically, a voiced segment of speech includes a clear periodic structure and the value of the pitch period (which is the cycle length of this period) remains approximately the same, or it changes only slightly within this segment. However, an unvoiced segment of speech is typically a noise-like signal without any significant periodicity.

The gain associated with the pitch period value (the "pitch gain") can be used to further elaborate voiced/unvoiced indication in the AMR decoder: typically in voiced speech the pitch gain is high (near 1.0) and remains relatively constant from (sub)frame to (sub)frame, whereas in unvoiced speech the pitch gain varies in a substantially random-like manner. In the AMR codec (and all other codecs mentioned above) the pitch gain is also a parameter that is received for each subframe.

Additional methods that can be employed to obtain additional information to use in classifying or verifying the classification of voiced/unvoiced frames may be to observe the zero crossing rate within a received frame (for unvoiced speech the zero crossing rate is typically significantly higher than for voiced speech), to observe energy of the synthesized speech signal (energy of voiced signal is typically higher than that of unvoiced signal), or to observe the energy distribution between the high and low energy bands of the synthesized speech signal (for voiced speech most energy is concentrated in the low-frequency band, while this is not the case for unvoiced speech). Further methods for performing relatively simple voiced/unvoiced classification include observing the linear prediction error which, in the decoder 20, can be performed by computing the ratio between the energy of the synthesis filter input signal, i.e., the excitation signal, and the energy of the synthesized speech. Typically lower values for the linear prediction error are achieved for voiced speech than for unvoiced speech. Another technique is based on observation of the energy distribution between adaptive and fixed (algebraic) codebook contributions (see, for example, 3GPP TS 26.090, "AMR speech codec; transcoding functions", for a further discussion of these codebooks).

It should be noted that a number of other methods exist that are suitable for making the voiced/unvoiced classification, and thus the foregoing are not to be construed in a limiting sense, but as only being exemplary of suitable methods fore making the voiced/unvoiced determination or characterization. It should further be noted that while these methods may normally specified to be performed in the speech encoder, those skilled in the art will realize that many of these methods can also be implemented in the speech decoder 20, as is the case with the various methods listed above.

While the use of one or more of the foregoing exemplary methods would introduce a small additional computational load, as these are operations that are not part of the normal speech decoding process, these are relatively simple operations and their computational load, as compared to that of the decoding process itself, is essentially negligible.

One method to detect transient frames can be to perform the analysis described above separately for the halves of the received frame, and a different voiced/unvoiced decision for each of the halves of the same frame would clearly indicate a transient frame. This technique would be especially useful detecting the transition from voiced to unvoiced. Inactive frames transmitted as speech (typically at the end of a talk spurt) can be detected based on their very low energy (compared to frames that carry actual speech signal).

As should be appreciated, the specifics of the frame-type classification in the speech decoder 20 can be codec-specific, and thus the foregoing discussion of frame-type classification is intended to be read as providing several simple examples of suitable embodiments, and not as an exhaustive treatment of the subject.

The unvoiced or non-active types of speech frames are considered to be presently preferred for performing signal manipulation. However, some unvoiced frames can carry a signal with a relatively high energy (i.e., a high "volume") with some variation, and therefore care should be taken in order not to introduce discontinuities in the energy level that can result in audible degradations. Thus, it is preferred also during unvoiced speech to perform re-synchronization in small steps.

As was noted above, the speech decoder 20 generally has access to parameters that may be used to evaluate the current speech frame type. Therefore, performing the re-synchronization process in close cooperation with the speech decoder 20 is preferred, since it enables resynchronization with minimal additional processing.

Figure 6:
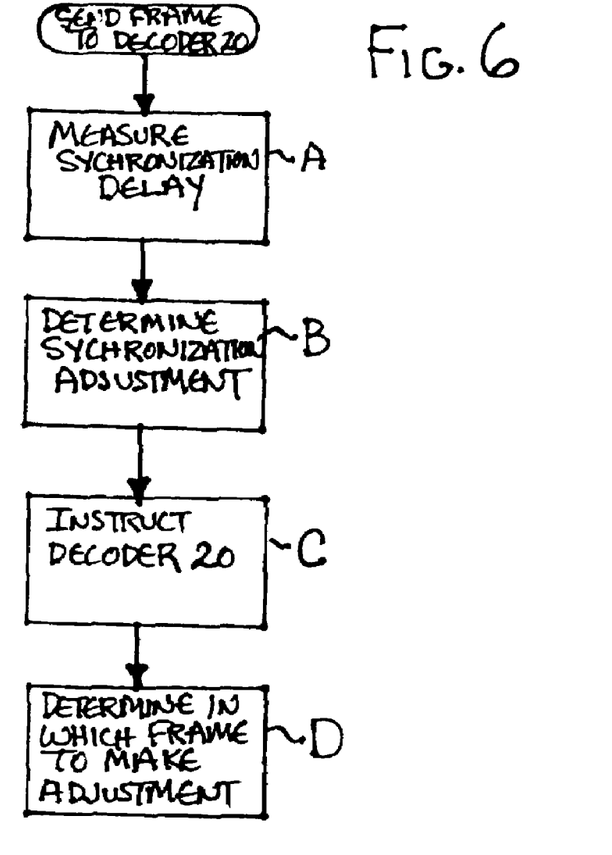
FIG. 6 is a logic flow diagram depicting the operation of the media subsystem when performing re-synchronization during a talk spurt.

Referring to FIG. 6, the synchronization delay can be reduced without affecting voice quality during a talk spurt by the following method. At Step A, as the speech frame is sent to the decoder 20, the synchronization delay is measured, and at Step B, based on an algorithm that is described in detail below, a determination is made of how much the synchronization delay should be adjusted. The decoder 20 is instructed at Step C to adjust the playout synchronization by adding or dropping an appropriate number of speech samples. As the decoder 20 decodes the frame, it determines in which part of the current frame (or in a few following frames within some suitable specified time window) a synchronization adjustment can be made without degrading the speech quality (Step D). This is preferably accomplished for some predefined duration of data, which can be any fragment of the audio frame duration down to as little as one sample, in steps of size one sample. Note that the adjustment can be made either by some entire segment at one time, or as a series of smaller adjustments.

In general, audio samples are either removed or added in locations where it is not considered to be audible to the user, as discussed above. When samples are removed from the frame, the synchronization delay is shortened, and when samples are added to the frame the synchronization delay is increased. For example, adding a few samples in the audio device 14 increases the synchronization delay and compensates for the slow movement in the delay diagram due to clock drift, as shown in FIG. 3. Preferably, the step of adjusting selects, if possible, an unvoiced frame to make the re-synchronization adjustment, and discriminates against making the adjustment in a transient frame. If necessary, the adjustment can be made in a voiced frame, but preferably the adjustment is made in small increments so as to avoid generating an audible artifact.

Figure 7:
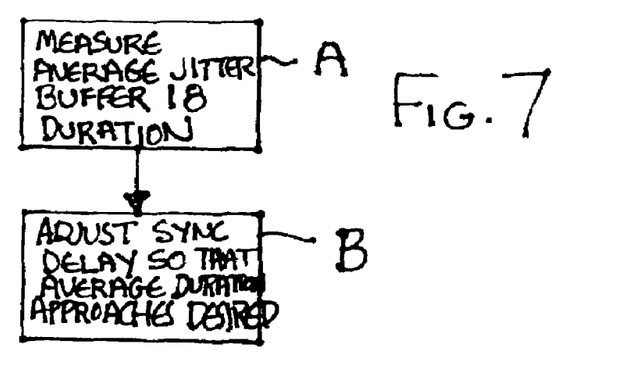
FIG. 7 is a logic flow diagram that illustrates the operation of an algorithm in Step B of FIG. 6 for determining by how much to adjust the synchronization delay.

Referring to FIG. 7, the presently preferred, but non-limiting algorithm for determining by how much to adjust the synchronization delay is as follows: (A) the average duration that a packet resides in the spends in the jitter buffer 18 is measured; and (B) the synchronization delay is adjusted so that the average duration approaches a desired jitter buffer 18 duration.

As non-limiting examples, the apparatus and method described above can be embodied within a wireless communications device, such as a mobile telephone, a cellular radiotelephone or a personal communicator, and the packet can be a speech packet received from a radio channel. The apparatus and method described above may also be embodied within a personal computer (PC) based telephony system, an Internet Protocol (IP) telephony gateway or an IP-to-circuit switched media transcoder.

Furthermore, while disclosed in the context of transmitting, storing and reproducing voice or speech data, it can be appreciated that these teachings are not limited to only voice or speech data, and that other types of audio data, such as music, may also benefit from the use of the methods and apparatus disclosed herein. In this case a talk spurt can be assumed to represent some other type of audio information, such as a musical passage that follows of period of silence.

What is claimed is:

1. A method comprising:
    when a frame comprising active speech data is sent to a decoder, measuring synchronization delay;
    determining by how much the synchronization delay should be adjusted;
    selecting a frame of the active speech data in dependence on characteristics of the active speech data reflected in the frame; and
    adjusting the synchronization delay during a period of active speech by adding or removing one or more audio samples in the selected frame so as not to significantly degrade the quality of the played back active speech data.

2. A method as in claim 1, where the step of determining determines the number of audio samples in steps of size one sample.

3. A method as in claim 1, where when the synchronization delay is adjusted by more than one audio sample, the adjustment is made by all of the determined audio samples in one adjustment.

4. A method as in claim 1, where when the synchronization delay is adjusted by more than one audio sample, the adjustment is made by less than all of the determined audio samples by a plurality of adjustments.

5. A method as in claim 1, where the step of selecting selects, if possible, an unvoiced frame.

6. A method as in claim 1, where the step of selecting discriminates against a transient frame.

7. A method as in claim 1, where the step of determining comprises measuring an average amount of time that a frame resides in a jitter buffer; and adjusting the synchronization delay so that the average duration approaches a desired jitter buffer residency duration.

8. A method as in claim 1, where at least one frame of audio data has a playback duration in the range of about 20 milliseconds to about 60 milliseconds.

9. Apparatus comprising:
    buffer circuitry for storing active speech data from a packet prior to the active speech data being sent to a decoder; and
    control circuitry operable when a frame comprising active speech data is sent to the decoder, the control circuitry configured to measure synchronization delay; to determine by how much the synchronization delay should be adjusted; to select a frame of the active speech data in dependence on characteristics of the active speech data reflected in the frame; and to adjust the synchronization delay by adding or removing one or more audio samples in the selected frame so as not to significantly degrade the quality of the played back audio data.

10. Apparatus as in claim 9, where said control circuitry determines the number of audio samples in steps of size one sample.

11. Apparatus as in claim 9, where when the synchronization delay is adjusted by more than one audio sample, the adjustment is made by all of the determined audio samples in one adjustment.

12. Apparatus as in claim 9, where when the synchronization delay is adjusted by more than one audio sample, the adjustment is made by less than all of the determined audio samples by a plurality of adjustments.

13. Apparatus as in claim 9, where said control circuitry is further configured to select, if possible, an unvoiced frame.

14. Apparatus as in claim 9, where said control circuitry is further configured to discriminate against a transient frame for making the adjustment.

15. Apparatus as in claim 9, where said control circuitry, when determining by how much the synchronization delay should be adjusted, operates to measure an average amount of time that a frame resides in said buffer, and adjusts the synchronization delay so that the average duration approaches a desired buffer residency duration.

16. Apparatus as in claim 9, where at least one frame of audio data has a playback duration in the range of about 20 milliseconds to about 60 milliseconds.

17. Apparatus as in claim 9, where said buffer and control circuitry is contained within a wireless communications device, and where the packet is received from a radio channel.

18. Apparatus as in claim 9, where said buffer and control circuitry is contained within a device that processes and plays back packetized speech data.

19. Apparatus as in claim 9, where said buffer and control circuitry comprises part of a mobile telephone or a personal communicator.

20. Apparatus as in claim 9, where said buffer and control circuitry comprises part of a cellular radiotelephone.

21. Apparatus as in claim 9, where said buffer and control circuitry comprises part of a PC-based telephony system.

22. Apparatus as in claim 9, where said buffer and control circuitry comprises part of an IP telephony gateway.

23. Apparatus as in claim 9, where said buffer and control circuitry comprises part of an IP-to-circuit switched media transcoder.

24. A method for operating a communication device while synthesizing speech from speech data, the method operating to reduce synchronization delay and comprising:

for a received frame comprising encoded active speech data to be sent to a speech decoder, measuring the synchronization delay;

determining by how much the synchronization delay should be adjusted; and adjusting the synchronization delay by adding or removing one or more speech samples in a selected frame of the active speech data so as not to significantly degrade the quality of the reproduced speech, where the frame is selected based on at least one speech decoder-related parameter so as to select, if possible, an unvoiced frame over a voiced frame, while discriminating against selecting a transient frame.

25. A method as in claim 24, where the step of determining determines the number of samples in steps of size one sample.

26. A method as in claim 24, where when the synchronization delay is adjusted by more than one sample, the adjustment is made by all of the determined samples in one adjustment.

27. A method as in claim 24, where when the synchronization delay is adjusted by more than one sample, the adjustment is made by less than all of the determined samples by a plurality of adjustments.

28. A method as in claim 24, where the step of determining comprises measuring an average amount of time that a frame resides in a jitter buffer; and adjusting the synchronization delay so that the average duration approaches a desired jitter buffer residency duration.

29. A method as in claim 24, where the at least one speech decoder-related parameter is comprised of a pitch period.

30. A method as in claim 24, where the at least one speech decoder-related parameter is comprised of a pitch gain.

31. A method as in claim 24, where the at least one speech decoder-related parameter is comprised of a zero crossing rate within a received frame.

32. A method as in claim 24, where the at least one speech decoder-related parameter is comprised of an energy distribution between adaptive and fixed codebook contributions.

33. A method as in claim 24, where the at least one speech decoder-related parameter is comprised of a measure of energy of a synthesized speech signal.

34. A method as in claim 24, where the at least one speech decoder-related parameter is comprised of a value of a linear prediction error.

35. A method as in claim 24, where the at least one speech decoder-related parameter is comprised of a value of a ratio of between an excitation signal at a synthesis filter input and the energy of a synthesized speech signal.

36. A method as in claim 24, where said speech decoder comprises a GSM speech decoder.

* * * * *